3,690,831
METHOD OF PREPARING CARBON BLACK OF LARGE PARTICLE SIZE AND LOW STRUCTURE
Wagi Kobayashi and Fumitugu Narisawa, Niigata, Japan, assignors to Asahi Carbon Co., Niigata-ken, Japan
Filed Feb. 19, 1970, Ser. No. 12,755
Claims priority, application Japan, Sept. 25, 1969, 44/76,381
Int. Cl. C09c 1/48
U.S. Cl. 423—449
7 Claims

ABSTRACT OF THE DISCLOSURE

A method of preparing carbon black of large particle size and low (less linked) structure comprising the steps of: jetting the feed oil together with the primary air into the reaction chamber from one end of a cylindrical furnace to opposite end thereof; simultaneously introducing the secondary air from a plurality of air orifices into said reaction chamber tangentially along the circular inner-wall thereof; and combusting incompletely said feed oil; wherein the angle of said jetting is regulated and the secondary air streams are introduced in the same tangential directions or in opposed tangential directions at the specifically located air orifices.

BACKGROUND OF THE INVENTION (a) Field of the invention

The present invention relates to an improved method of preparing carbon black having a large particle size and a low structure.

(b) Description of the prior art

Currently popular carbon black has been classified into various kinds according to its use, and the criteria for classification thereof has been mainly the particle size and the degree of structure which signifies the linkage of particles. According to ASTM, for instance, carbon black has been classified into various categories such as ISAF (Intermediate Super Abrasion Furnace), HAF (High Abrasion Furnace), GPF (General Purpose Furnace), FT (Fine Thermal), MT (Medium Thermal), etc. with the foregoing categories being arranged in the order of increasing particle size.

As for the method of preparation thereof, the oil furnace method, commended as a method suitable for increasing the yield and mass production thereof, has hitherto been taking the place of the channel method or the thermal method, but it is regarded as a task of extreme difficulty for said oil furnace method to produce carbon black of large particle size and low structure (structure composed of less linked particles) such as those classified as FT (which particle size is 101–200 m$\mu$) and MT (which particle size is 201–500 m$\mu$). Under the existing circumstances, therefore, there is no alternative but to depend on the thermal method in preparing carbon black of FT and MT classes.

The thermal method usually comprises the steps that, upon heating a multiplicity of checkers equipped within a reaction tower, a gaseous hydrocarbon material—mainly methane gas—is introduced into said tower, thereby effecting catalytic cracking of said material through contact with the heated checkers.

As to the oil furnace method on the other hand, it comprises the steps of: jetting the feed oil such as heavy oil, creosote, etc. together with the primary air into the reaction chamber from a feed injection nozzle at one end of a cylindrical furnace, usually built of fire brick, and flowing same toward the opposite end thereof; simultaneously introducing, under pressure, secondary air from a set of air orifices (that is, a couple of diametrically opposite upper and lower orifices, which are hereinafter referred to as a set of air orifices) located close to the nozzle, the secondary air flowing into said reaction chamber tangentially along the circular inner-wall thereof, thereby causing said primary and secondary air to form a helically moving stream of combustion with the feed oil; and introducing said stream into a collector after cooling it directly or indirectly. In other words, the oil furnace method is devised to utilize the incomplete combustion of oily materials.

As discussed in the foregoing, it is extremely difficult to produce carbon black of FT and MT classes by the oil furnace method, but, this notwithstanding, said oil furnace method per se has such advantages that it can employ low-priced materials as compared with the thermal method, that it does not require a huge investment in equipment when mass production is intended, etc., and, therefore, its industrial profitability is greater than that of the thermal method.

The inventors of the present invention have succeeded, after a series of researches, in preparing carbon black having a grade equal to that produced by the thermal method, but in which the oil furnace method is used and with little modification of the apparatus therefor.

SUMMARY OF THE INVENTION

One object of the present invention is to provide a method of preparing carbon black comprising the steps of: jetting the feed oil together with the primary air into the reaction chamber from a feed injection nozzle at one end of a cylindrical furnace and flowing same toward the other end thereof; simultaneously introducing secondary air from air orifices into said reaction chamber tangentially along the circular inner-wall thereof; and causing incomplete combustion of said feed oil, the invention being characterized by the fact that the angle of said jetting is regulated to be less than 35° and that a plurality of air orifices are provided so as to introduce said secondary air in same tangential direction with each other or in opposed tangential directions at the air orifices, one of which is disposed close to the nozzle and at least another one of which is disposed at a distance of more than 800 mm. away from the air orifice close to the nozzle.

Another object of the present invention is to provide carbon black having a grade equal to that prepared by the thermal method, that is, carbon black of large particle size and low structure corresponding to that of FT and MT classes.

The present invention is an improvement of the hitherto known oil furnace method, and is characterized by a special way of spraying the feed oil and of introducing the secondary air. The prevalent size of the furnace employed in the oil furnace method of the prior art is in the range of about 250–1200 mm. in inner diameter and about 3000–6000 mm. in length of the reaction chamber, while the dimension of the furnace according to the present invention is 400–2000 mm.$\phi$ x 3000–6000 mm. Therefore, even a conventional furnace is usable for the method according to the present invention subject to remodeling thereof so as to satisfy the first prerequisite and the second prerequisite as elucidated in the following.

To begin with, said first prerequisite is to regulate the angle of spraying the feed to be in a specific range.

There are a variety of theories concerning the mechanism of formation of carbon black, but the most fundamental theory is that, said formation is caused by a vigorous free radical reaction due to thermal cracking of the feed oil, and therefore, when this reaction is caused to finish rapidly, there is obtained carbon black of comparatively small particle size, while when the reaction is slowly effected over a long period of time, there is obtained carbon black of large particle size. According to the conventional oil furnace method, the spray angle is in the broad range of about 25 to 140 degrees and, as for the air orifice, there is employed only one set of air orifices disposed nearby the feed injection nozzle, so that said reaction progresses rapidly, making it impossible to obtain products of large particle size and low structure as is desired. However, when the spray angle is regulated to be less than 35 degrees as in the present invention, the feed oil is blown a long way as a stream of smaller width consequently extending the effective range of the reaction zone, whereby said reaction can be effected slowly and over a long period of time, coupled with the second prerequisite as elucidated below. Accordingly, when the spray angle exceeds the foregoing range, it is impossible to obtain satisfactory products.

The second prerequisite is to introduce the secondary air streams into the reaction chamber tangentially along the circular inner-wall thereof in the same tangential directions or in opposed tangential directions at at least two sets of air orifices one of which is located close to the feed injection nozzle and at least another one of which is disposed at a distance of more than 800 mm. away from said first mentioned set of air orifices close to the feed injection nozzle.

In other words, it is feasible to effect the intended reaction step by step and slowly on the premise that the introduction of air is to be performed by means of plural sets of air orifices instead of only one set of air orifices close to the feed injection nozzle as in the prior art, coupled with the foregoing first prerequisite. However, when the set of air orifices close to the feed injection nozzle (hereinafter referred to as the first set of air orifices) and the next set of air orifices (hereinafter referred to as the second set of air orifices) are disposed too close to each other, they form practically no more than one set and can not contribute to prolong the reaction time. This is the reason why the spacing between the first set of air orifices and the second set of air orifices is regulated to be more than 800 mm. in the present invention.

The result of experiments has proved that, by providing a space of more than 800 mm. between the first and second sets of air orifices, the reaction proceeds slowly and requires a long period of time to finish thereby producing the desired end product. Further, the oil furnace employed in the present invention can utilize a third set of air orifices and so on, in addition to the second set of air orifices at any place in the reaction chamber. Moreover, each set of air orifices can include not only the two diametrically offset principal orifices, but also can include supplementary air orifices in optional numbers and at any places of the reaction chamber for the purpose of separately blowing in the secondary air fed to the air orifices. The areas of the principal air orifices to each of said supplementary air orifices is not restricted. In short, the oil furnace employed in the present invention is provided with a nozzle capable of jetting the feed oil together with primary air at an angle regulated to be less than 35 degrees and a plurality of sets of air orifices, one of which is disposed near to said nozzle and at least another one of which is spaced more than 800 mm. therefrom.

The conditions pertaining to the feed material and the combustion thereof are almost the same as those of conventional oil furnace method. That is, as to the feedstock material, heavy oil, creosote, etc. are suitable, and, as to the conditions of combustion thereof, it is desirable to employ a temperature in the range of 1400–1550° C. at a maximum spray pressure of the feed oil in the range of 0.5–1.2 kg./cm.$^2$, the primary air pressure for spraying in the feed oil in the range of 0.8–1.3 kg./cm.$^2$ and the secondary air pressure in the range of 0.4–0.8 kg./cm.$^2$, but the invention is not limited to the foregoing ranges. In this context, the pressure of the separated secondary air to be blown from the supplementary air orifices is in proportion to the secondary air pressure, but is not particularly limited to the foregoing range.

BRIEF DESCRIPTION OF THE DRAWINGS

In the accompanying drawings.

Elucidation of the present invention is hereunder given by reference to the accompanying drawings. In FIGS. 1 and 2 of said drawings, 1 is a nozzle for spraying the feed oil, 2, 3 and 4 are the first, second and third sets of air orifices, respectively, and 2' and 2'', 3' and 3'', and 4' and 4'' are the supplementary orifices belonging to the foregoing sets of air orifices, respectively. The afore-mentioned first prerequisite is determined by the structure of the nozzle 1, but it is convenient for producing the intended products to apply the air-spray process, and, in this event, it is desirable that the quantity of air to be fed in for use in spraying the feed oil is more than 10% of the total quantity of air to be employed for combustion of said feed oil. The first set of air orifices 2 is located nearest to the nozzle in the same manner as the air orifice in the prior art, and the second set of air orifices 3 is provided at a place more than 800 mm. away from said first air orifice. In addition, there may be provided the third air orifice 4 following the second air orifice 3. Further, there may be provided the first supplementary air orifices 2' and/or 2'' as part of the first set of air orifices for the purpose of introducing air separated from the secondary air to be fed in the first air orifice 2. There may also be provided the second supplementary air orifices 3' and/or 3'' and the third supplementary air orifices 4' and/or 4'' to provide the second air orifice group and the third air orifice group, respectively. As to the reason for providing such supplementary orifices, the first and second air orifice groups are for the purpose of preventing the deposition of carbon, while the third air orifice group and any following ones are provided not only for preventing the deposition of carbon but also for removing non-cracked substance (tar), and, accordingly, the more supplementary air orifices are provided, the better are the results. Moreover, as for the principal air orifices or the supplementary air orifices, each pair of diametrically offset upper- and lower-orifices thereof comprise one set, and they are disposed tangentially relative to the reaction chamber as shown in FIG. 2 so as to introduce the secondary air or the separated portion of said secondary air by blowing therethrough in the same tangential direction or in opposite tangential directions at the air orifices opening tangentially along the circular inner-wall of said chamber. As to the disposition of air orifices from the third set and so on, it will do to dispose them either between the first and the second sets of air orifices or following the second set of air orifices as shown in FIG. 1.

FIG. 3 shows an example of the pattern of the nozzle according to the present invention, wherein 5 is the pipe to supply the feed oil and 6 is the pipe to introduce primary-air, and the feed oil is sprayed as it is mixed with air by virtue of the jetting of said primary air. FIG. 4 shows a type of the oil furnace which is devised to combine the jetting by the pressure of the feed oil per se and the jetting by air, and 7 is the tip for jetting the feed oil.

According to the present invention, the conventional oil furnace can be utilized without any radical remodeling thereof, and it is possible to produce carbon black having a mean particle size of 120–500 m$\mu$, such as classified as FT or MT, at a low cost.

DESCRIPTION OF THE PREFERRED EMBODIMENTS

Example 1

Figure 1:
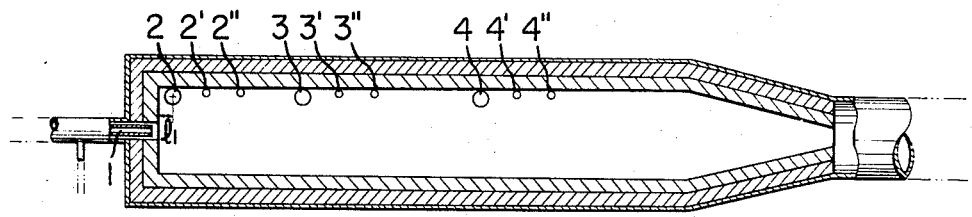
FIG. 1 shows a central longitudinal sectional view of an example of an oil furnace to be employed for carrying out the method under the present invention.
Figure 2:
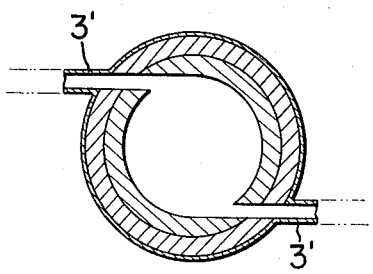
FIG. 2 is a cross section at 3' in FIG. 1.
Figure 3:
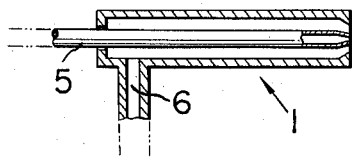
FIGS. 3 and 4 show cross sections of nozzles according to the present invention.
Figure 4:
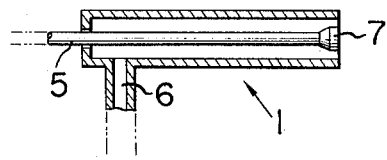

By employing an oil furnace of the pattern shown in FIG. 1 (except that it did not include the aforesaid third air orifices group 4, 4', 4'' and the supplementary air orifices 2', 2'' and 3', 3'') and the following steps were carried out: heavy oil was jetted into the furnace together with the primary air from the nozzle (of the same pattern as shown in FIG. 3) equipped on one end of said furnace; the secondary air was blown into the furnace through the first and second sets of air orifices tangentially along to the circular inner-wall thereof, causing incomplete combustion of the feed oil and the formation of a helical stream; subsequently the thus formed carbon black was directly introduced into a cooling tower where it was cooled down to below 250° C. by means of a waterspray; and then the thus treated carbon black was collected by means of a cyclone and a bag filter. There was obtained a product having a particle size as intended. The measurements of the apparatus employed, the conditions of combustion, and so forth were as shown in the following.

Measurement of the reaction chamber:

Length—4000 mm.
Inner diameter—600 mm$\phi$
Inner diameter of the nozzle—14 mm.
Angle of spraying the feed oil—27 degrees
Pressure of the primary air—1.2 kg./cm.$^2$
Inner diameter of the first air orifice—52.9 mm$\phi$
Inner diameter of the second air orifice—52.9 mm$\phi$
Location of the first air orifice ($l_1$)—50 mm.
Center distance between the first air orifice and the second air orifice—800 mm.
Pressure of the secondary air (at the first and second air orifices)—0.6 kg./cm.$^2$
Amount of the feed oil—150 kg./hr.
Amount of the primary air—120 kg./hr.
Amount of the secondary air:
    At the first air orifice—200 kg./hr.
    At the second air orifice—150 kg./hr.
Combustion temperature—1450–1550° C.
Direction of the secondary air flow at the air orifices—all in the same direction, with each other

Example 2

By employing the same apparatus as that of Example 1 (except for modification of the center distance between the first and second sets of air orifices) and provided additionally with the third set of air orifices 4 (but not including the third supplementary air orifices 4'–4'') as shown in FIG. 1 and following the steps applied in Example 1 but under the following conditions, there was obtained a product as intended.

Inner diameter of the third air orifice—52.9 mm$\phi$
Center distance between the first air orifice and the second air orifice—1000 mm.
Center distance between the second air orifice and the third air orifice—1000 mm.
Pressure of the secondary air (at the third air orifice)—0.6 kg./cm.$^2$
Amount of the secondary air:
    At the first air orifice—200 kg./hr.
    At the second air orifice—80 kg./hr.
    At the third air orifice—100 kg./hr.
Direction of the secondary air blow at these air orifices—all the same with each other

Example 3

By employing the same apparatus as that of Example 2 and provided additionally with the first supplementary air orifices as indicated by 2' and 2'' in FIG. 1 and following the steps applied in Example 1 but under the following conditions, there was obtained a product as intended.

Inner diameter of each the first supplementary air orifice—27.6 mm$\phi$
Center distance between the first air orifice 2 and the first supplementary air orifice 2'—200 mm.
Center distance between the first supplementary air orifice 2' and the first supplementary air orifice 2''—200 mm.
Amount of the secondary air:
    At the first air orifice—100 kg./hr.
    At each of the first supplementary air orifices—50 kg./cm.$^2$
Direction of the secondary air blow at these air orifices—all the same with each other

Example 4

By employing the same apparatus as that of Example 3 provided additionally with the second supplementary air orifices as indicated by 3' and 3'' in FIG. 1 and following the steps applied in Example 1 but under the following conditions, there was obtained a product as intended.

Inner diameter of each the second supplementary air orifice—27.6 mm$\phi$
Center distance between the second air orifice 3 and the second supplementary air orifice 3'—200 mm.
Center distance between the second supplementary air orifice 3' and the second supplementary air orifice 3''—200 mm.
Feed of the secondary air:
    At the second air orifice—50 kg./hr.
    At each of the second supplementary air orifices—15 kg./cm.$^2$
Direction of the secondary air blow—all the same with each other

Example 5

By employing the same apparatus as that of Example 4 and provided additionally with the third supplementary air orifices as indicated by 4' and 4'' in FIG. 1 and following the steps applied in Example 4 but under the following conditions, there was obtained a product as intended.

Inner diameter of each third supplementary air orifice—27.6 mm$\phi$
Center distance between the third air orifice 4 and the second supplementary air orifice 4'—200 mm.
Center distance between the third supplementary air orifice 4' and the second supplementary air orifice 4''—200 mm.
Amount of the secondary air:
    At the third air orifice—60 kg./hr.
    At each of the third supplementary air orifices—20 kg./hr.
Direction of the secondary air blow—all the same with each other

Example 6

By employing the same apparatus as that of Example 5 except for reversing the tangential direction of the secondary air flow to at only the second set of air orifices with reference to the direction of air flow at the other sets of air orifices following, and the steps were carried out as in Example 1, there was prepared carbon black of the present example.

Next, for the purpose of comparison, two kinds of carbon black were prepared by the following methods, respectively: a method wherein the same apparatus as that of Example 1 was used, except that the second set of air orifices was omitted was employed while following the steps of Example 1 (which product is hereinafter referred to as Comparative Example 1); and a method wherein the same apparatus as that of Example 2, except for modification of the angle of jetting the feed oil to 45 degrees, while following the steps of Example 1 (which product is hereinafter referred to as Comparative Example 2).

The result of the comparison of these three kinds of carbon black with the carbon black prepared by the method of the present invention was as shown in the following Table 1. In this connection, the properties of a product to be obtained by the thermal method (employing methane gas as the feed material) are also shown for reference purposes.

TABLE 1

| Item | Thermal method | Example 1 | 2 | 3 | 4 | 5 | 6 | Comp. 1 | 2 |
|---|---|---|---|---|---|---|---|---|---|
| Oil absorption (cc./100 g.) | 43 | 50 | 48 | 48 | 45 | 46 | 40 | 98 | 66 |
| Iodine absorption (mg./g.) (ASTM D1510-65) | 11.3 | 16.3 | 9.8 | 10.5 | 13.2 | 13.0 | 16.3 | 111.2 | 33.8 |
| pH (ASTM D1512-60) | 6.65 | 7.91 | 8.47 | 8.62 | 8.45 | 8.01 | 7.96 | 8.44 | 8.11 |
| Volatile matter (percent) (ASTM D1620-60) | 0.96 | 0.70 | 0.88 | 0.79 | 0.74 | 0.70 | 0.67 | 0.69 | 0.85 |
| Mean particle size (m$\mu$) (by electron microscope) | 210 | 256 | 322 | 314 | 240 | 252 | 182 | 33 | 94.1 |
| Yield (percent) | | 48.0 | 48.5 | 48.5 | 48.0 | 47.0 | 46.3 | 42.4 | 46.9 |

NOTE.—(1) Oil absorption required for carbon black having a particle size of more than 120 m$\mu$ is less than 50 cc./100 g, iodine absorption required for the same is less than 30 mg./g., and, as for other items, there are no specific requirements. (2) Oil absorption means the quantity of spindle oil at the time when saturation has reached in case of adding white spindle oil to carbon black for kneading.

As seen from the foregoing table, preparation of carbon black of FT and MT classes is infeasible by the methods employed for the comparative examples, and, besides, there is considerable difference between the properties of said comparative examples and the products in the present invention. Further, it is noted that the product in Example 6 is of lower structure compared with those of Examples 1 through 5.

Next, in case where the product under the present invention and that of the thermal method were respectively mixed with rubber in accordance with ASTM D-15-68 and tested as regards their properties, the results were as shown in the following.

TABLE 2
Composition (unit: parts by weight)

| Component | IRB #2 | Product by thermal method | Product under present invention |
|---|---|---|---|
| Natural rubber RSS No. 1 | 100 | 100 | 100 |
| Stearic acid | 3 | 3 | 3 |
| Zinc white (ZnO) | 5 | 5 | 5 |
| Sulphur | 2.5 | 2.5 | 2.5 |
| Vulcanizing accelerator (dibenzothiazyl disulfide) | 0.6 | 0.6 | 0.6 |
| Carbon black | 50 | 75 | 75 |

What we claim is:

1. A method of producing carbon black of the FT and MT types by the oil furnace process, in a cylindrical furnace having a cylindrical reaction chamber, said chamber having a diameter in the range of 400 to 2000 mm. and having a length in the range of 3000 to 6000 mm., and a coaxial feedstock spray nozzle at one axial end of said reaction chamber, comprising the steps of: spraying a stream of hydrocarbon oil feedstock and primary air from said nozzle into the reaction chamber and directing same axially of the reaction chamber toward the opposite axial end thereof with the spray angle of said feedstock stream being less than 35 degrees so that a compact feedstock stream flows axially through the central portion of the reaction chamber; simultaneously introducing into the reaction chamber a plurality of axially spaced streams of secondary air directed tangentially along the side wall of the reaction chamber to create a turbulent flow of secondary air along said side wall and encircling said feedstock stream to prevent carbon deposition on said sidewall, one of said streams entering said chamber at a location close to said nozzle, another of said streams entering said chamber at a location spaced axially at least 800 mm. from said one stream in a direction toward the opposite axial end of said reaction chamber, the compact feedstock stream being contacted with secondary air over a lengthy reaction zone of at least about 800 mm. in length to thereby effect incomplete combustion of the feedstock slowly and over an extended period of time to form carbon black particles of the FT and MT type.

2. A method according to claim 1, in which all said streams of secondary air flow in the same tangential direction into the reaction chamber.

3. A method according to claim 1, in which said another stream flows into the reaction chamber in the opposite tangential direction from said one stream.

4. A method as defined in claim 1, in which only two axially spaced streams of secondary air are flowed into said reaction chamber.

5. A method as defined in claim 1, in which at least three axially spaced streams of secondary air are flowed into said reaction chamber.

6. A method as defined in claim 1, in which each of said streams of secondary air is comprised of a principal stream and at least one supplemental stream.

7. A method as defined in claim 1, in which the quantity of primary air sprayed in with said feedstock comprises at least 10% by weight of the total air introduced into the reaction chamber.

References Cited
UNITED STATES PATENTS

| 2,924,512 | 2/1960 | Webster et al. | 23—209.4 X |
| 2,953,436 | 9/1960 | Kron | 23—209.6 |
| 3,410,660 | 11/1968 | Henderson et al. | 23—209.4 |
| 3,333,928 | 8/1967 | Kobayashi | 23—209.6 |
| 2,656,254 | 10/1953 | Heller | 23—209.4 |
| 2,917,370 | 12/1959 | Edminster | 23—209.6 X |

EDWARD J. MEROS, Primary Examiner

G. ALVARO, Assistant Examiner

U.S. Cl. X.R.

23—259.5; 423—456